Oct. 24, 1933.  F. S. THURSTON  1,931,970
FOLDING BASKET
Filed Dec. 7, 1932  2 Sheets-Sheet 1
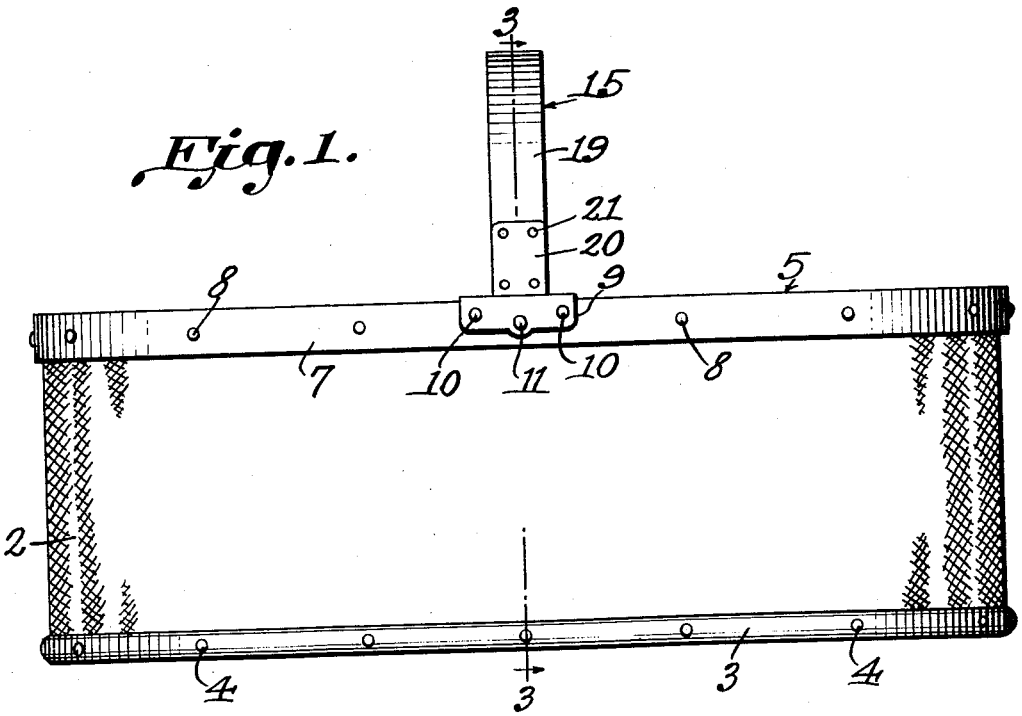
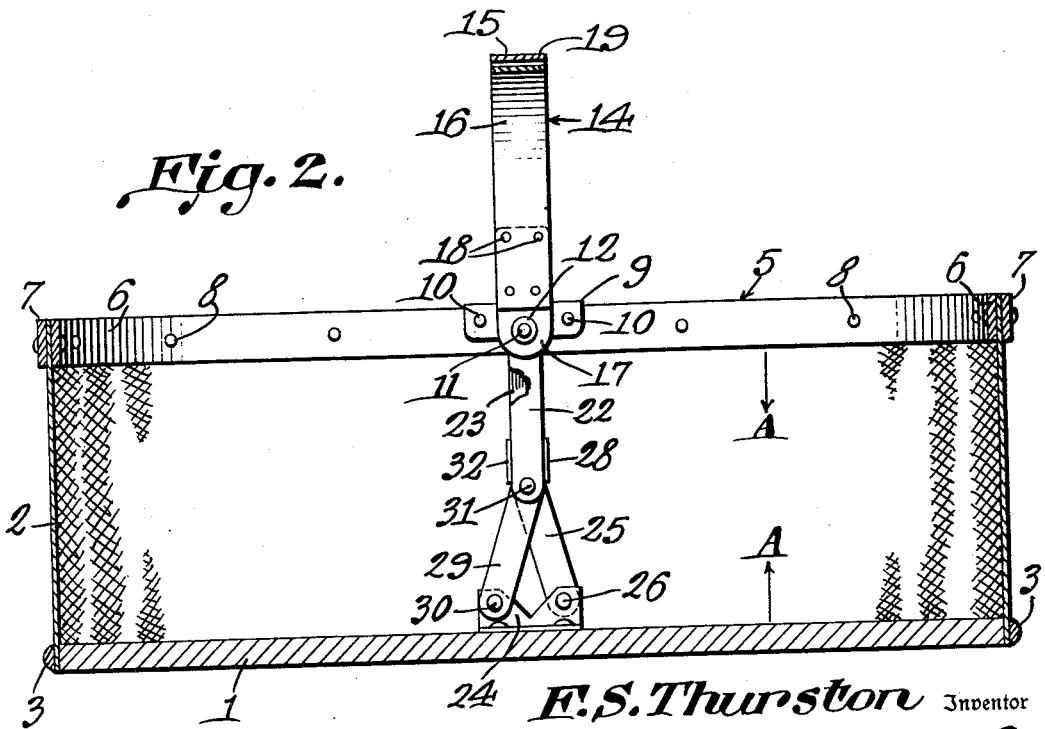
F. S. Thurston Inventor Oct. 24, 1933.          F. S. THURSTON          1,931,970
FOLDING BASKET
Filed Dec. 7, 1932                2 Sheets-Sheet 2
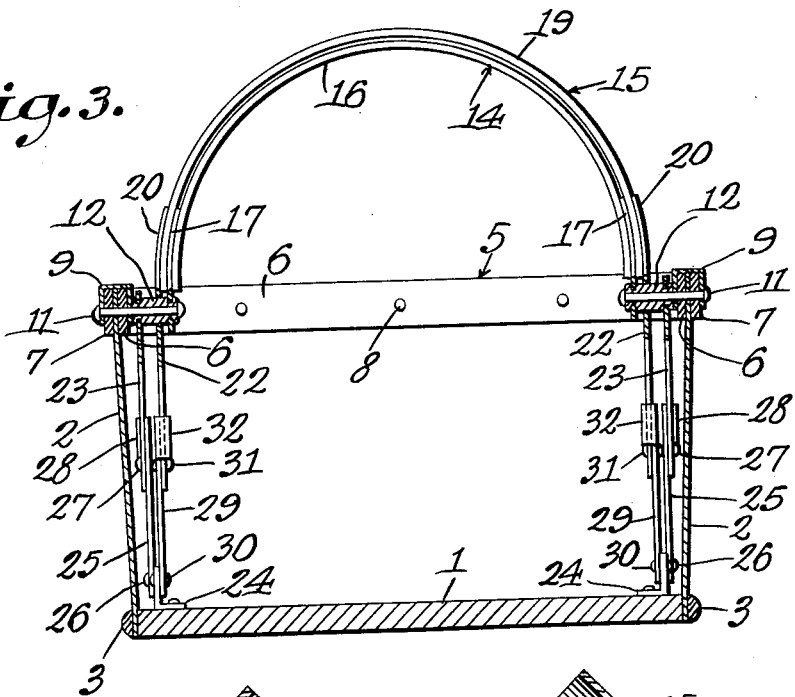
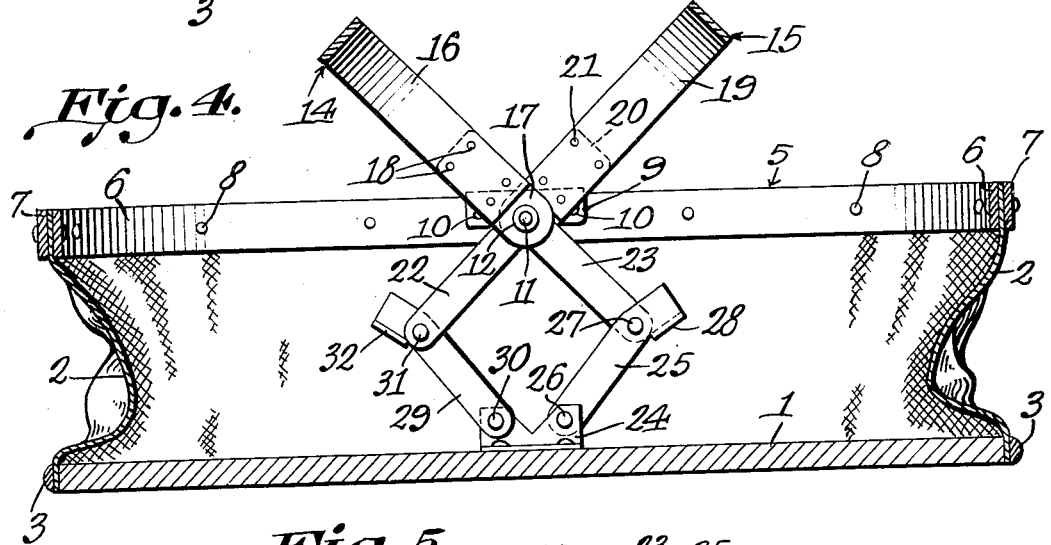
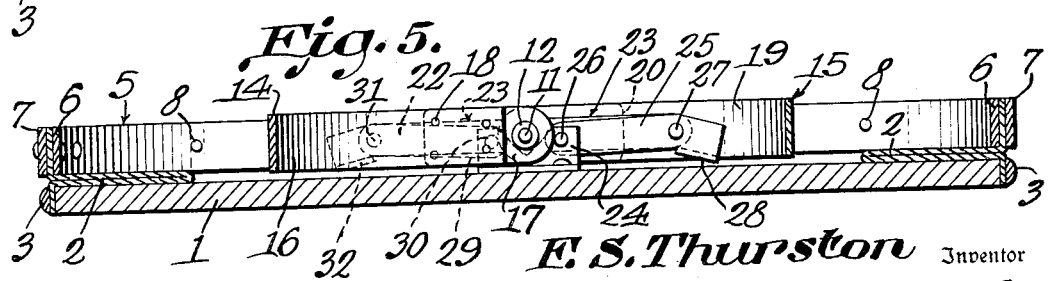
F. S. Thurston  Inventor Patented Oct. 24, 1933

1,931,970

UNITED STATES PATENT OFFICE 1,931,970

FOLDING BASKET

Frank S. Thurston, Miami, Fla.

Application December 7, 1932. Serial No. 646,200

3 Claims. (Cl. 150—49)

The device forming the subject matter of this application is a hand basket, and one object of the invention is to provide a novel means whereby the basket may be folded up in small space, when not in use. Another object of the invention is to provide novel means for holding the basket in operative condition, with the flexible wall of the body extended.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in side elevation, a basket constructed in accordance with the invention, and in condition for use;

Fig. 2 is a vertical longitudinal section;

Fig. 3 is a transverse section on the line 3—3 of Fig. 1;

Fig. 4 is a longitudinal section showing the basket partly collapsed;

Fig. 5 is a longitudinal section showing the basket completely collapsed.

The body of the basket comprises a bottom 1 shown, for the sake of simplicity in the drawings, as of one-piece construction, although any other kind of bottom can be used. The wall 2 of the basket body is flexible and may be made of canvas, for example. The lower end of the wall 2 of the body is held on the edge of the bottom 1 by a circumscribing cleat 3 and securing elements 4, passing through the cleat and through the wall 2 and entering the edge of the bottom 1.

The basket comprises a stiff rim 5, which may be made up of an inner hoop 6 and an outer hoop 7 held together by securing elements 8. The upper edge of the wall 2 of the basket extends between the hoops 6 and 7 and is bound therebetween and anchored therebetween, by the securing elements 8.

U-shaped brackets 9 are inverted over the rim 5 of the basket and are held thereon by securing devices 10. Fulcrum elements 11, such as rivets, are mounted on the rim 5, and extend inwardly, into the basket, as shown in Fig. 3. Sleeves 12 are mounted to turn on the inner portions of the fulcrum elements 11 and are held thereon by the inner heads of the fulcrum elements.

The device comprises a bail-shaped inner handle 14 and a bail-shaped outer handle 15, the construction being such that when the handles are in use, and in upstanding position, as shown in Figs. 1 and 2, the inner handle 14 fits within the outer handle 15.

The inner handle 14 comprises a curved grip 16, generally made of wood, and to the lower ends of the grip 16, metal extension pieces 17 are secured as shown at 18. These extension pieces 17 are secured to the sleeves 12, so that when the inner handle 14 is swung up or down, the sleeves 12 will turn on the fulcrum elements 11.

The outer handle 15 comprises a curved grip 19, preferably made of wood, and on that account, metal extension pieces 20 are secured at 21 to the lower ends of the grip 19. The extension pieces 20 of the outer handle 15, unlike the extension pieces 17 of the inner handle 14, are not secured to the sleeves 12, but are mounted to swing thereon, the extension pieces 20 being prolonged downwardly to form lever arms 22.

The description, as thus far set forth, justifies the reader in noting that the device comprises a basket body, sleeves 12 mounted at 11 to turn on the basket body, an inner bail-shaped handle 14 having its ends secured to the sleeves, and an outer, bail-shaped handle 15 fulcrumed intermediate its ends on the sleeves and extended below the sleeves to form lever arms 22.

Downwardly extended crank arms 23 are secured to the outer portions of the sleeves 12, inside of the flexible wall 2. Swinging motion can be transmitted to the crank arms 23, because these arms are secured to the sleeves 12, the extension pieces 17 of the grips 16 of the inner handle 14 being likewise secured to the sleeves 12.

Anchors 24 are secured to the bottom 1, near to opposite portions of the wall 2. Upwardly extended first links 25 have their lower ends pivoted at 26 to the anchors 24. Intermediate their ends, the first links 25 are pivoted at 27 to the lower ends of the crank arms 23 that are secured to the rotatable sleeves 12. On their upper ends, the first links 25 are provided with lateral stops 28, adapted to engage the outer edges of the crank arms 23.

The lower ends of upwardly extended second links 29 are pivoted at 30 to the anchors 24. Intermediate their ends, the second links 29 are pivoted at 31 to the lower ends of the lever arms 22 of the outer handle 15. The upper portions of the second links 29 have lateral stops 32, adapted to engage the outer edges of the lever arm 22.

When the basket is not in use, it can be folded into the flat, compact form of Fig. 5, an operation which will be obvious, without tracing out in detail, just how the several parts of the basket move. The basket is shown partially opened or extended in Fig. 4, and is shown completely extended in Figs. 3, 2 and 1.

Suppose that the handles 14 and 15 are swung upwardly, into a vertical position, and into alignment with each other, as disclosed in Fig. 2. During this operation, the inner handle 14 rotates the sleeves 12 on the fulcrum elements 11, and the crank arms 23 on the outer ends of the sleeves 12 carry the first links 25 into the position shown in Fig. 2. Likewise, as the outer handle 15 is swung upwardly into vertical alignment with the inner handle 14, the lever arms 22 on the lower ends of the handle 15 carry the links 29 into the position of Fig. 2. When the parts are thus arranged, the crank arms 23 and the lever arms 22 are in vertical alignment.

The operation last above described carries the bottom 1 downwardly, or the rim 5 of the basket upwardly, and the flexible wall 2 of the body of the basket is stretched tightly. The wall 2 of the basket body, being tightly stretched, has a vertical pull in the direction of the arrows A. This pull in the direction of the arrows A, causes the links 29 and 25 to press upwardly on the pivot elements 31 and 27, and causes the parts 23 and 22 to press downwardly on the said pivot elements. The pivot elements 31 and 27 are located above and between the pivot elements 26 and 30. Owing to this construction, and because the stops 28 engage the outer edges of the crank arms 23, and because the stops 32 engage the outer edges of the lever arms 22, the tighter the basket wall 2 is stretched, the more securely will it hold the basket in the erected, operative position of Fig. 2.

Having thus described the invention, what is claimed is:

1. A basket comprising a bottom, a rim, a flexible body connecting the bottom and the rim, bail-shaped handles, means for pivotally mounting the handles on the rim for swinging movement into and out of proximity to each other, and means connected to the rim and to the bottom and operatively connected with said handles to separate the rim and bottom and extend the basket when the handles are brought into proximity.

2. A basket comprising a bottom, a rim, a flexible body connecting the bottom and the rim, links pivoted at their lower ends to the bottom, inner and outer bail-shaped handles, sleeves mounted to turn on the rim, the inner handle having its ends secured to the inner ends of the sleeves, depending crank arms secured to the outer ends of the sleeves, the outer handle being fulcrumed on the sleeves, between the inner handle and the crank arms, the outer handle being extended downwardly below the sleeves to form lever arms, and pivot elements connecting the lower ends of the crank arms and of the lever arms with the links.

3. The basket of claim 2, further characterized by the fact that the pivot elements connect the crank arms and the lever arms with the respective links at points intermediate the ends of the links, the upper parts of the links being supplied with stops for engaging the outer portions of the crank arms and the lever arms respectively.

FRANK S. THURSTON.